(12) United States Patent
Asai

(10) Patent No.: US 9,255,477 B2
(45) Date of Patent: Feb. 9, 2016

(54) ROCKING PISTON TYPE COMPRESSOR

(75) Inventor: Masatoshi Asai, Tokyo (JP)

(73) Assignee: MAX CO., LTD., Tokyo (JP)

( * ) Notice: Subject to any disclaimer, the term of this patent is extended or adjusted under 35 U.S.C. 154(b) by 1116 days.

(21) Appl. No.: 13/095,272

(22) Filed: Apr. 27, 2011

(65) Prior Publication Data
US 2011/0277626 A1 Nov. 17, 2011

(30) Foreign Application Priority Data
May 11, 2010 (JP) .................................. 2010-109483

(51) Int. Cl.
| | |
|---|---|
| *F01B 9/02* | (2006.01) |
| *F16J 1/12* | (2006.01) |
| *F04B 39/00* | (2006.01) |
| *F04B 39/04* | (2006.01) |
| *F04B 53/12* | (2006.01) |

(Continued)

(52) U.S. Cl.
CPC ............. *F01B 9/026* (2013.01); *F04B 39/0005* (2013.01); *F04B 39/0022* (2013.01); *F04B 39/042* (2013.01); *F04B 39/044* (2013.01); *F04B 39/045* (2013.01); *F04B 53/121* (2013.01); *F04B 53/143* (2013.01); *F16J 1/12* (2013.01); *F01B 2011/005* (2013.01); *F16J 9/061* (2013.01); *F16J 15/3212* (2013.01)

(58) Field of Classification Search
CPC ............. F04B 39/0005; F04B 39/0022; F04B 39/042; F04B 39/045; F04B 39/044; F04B 53/143; F04B 53/121; F01B 9/026; F01B 2011/005; F16J 1/12; F16J 15/3208; F16J 15/3212; F16J 15/3488; F16J 9/145; F16J 9/061; F16J 9/063

USPC ............ 277/437, 438, 467, 468, 491; 92/240, 92/244, 194, 250
See application file for complete search history.

(56) References Cited

U.S. PATENT DOCUMENTS
| | | | |
|---|---|---|---|
| 1,000,563 A | 8/1911 | Stedman | |
| 1,273,737 A * | 7/1918 | Christenson | ................... 92/194 |

(Continued)

FOREIGN PATENT DOCUMENTS
| | | |
|---|---|---|
| DE | 29 15 848 A1 | 11/1980 |
| DE | 44 29 098 A1 | 2/1996 |

(Continued)

OTHER PUBLICATIONS
Machine translation of WO2004011804. 2014.*

(Continued)

*Primary Examiner* — Edward Look
*Assistant Examiner* — Michael Quandt
(74) *Attorney, Agent, or Firm* — Drinker Biddle & Reath LLP

(57) ABSTRACT

In a rocking piston type compressor, a piston rod 11 is rockingly slidable within a cylinder 10. The compressor is provided with a lip ring 20 and an expansion member 30. The lip ring 20 is configured to seal between the cylinder 10 and piston rod 11. The lip ring 20 is provided on a leading end portion 13 of the piston rod 11 and includes a bottom portion 21 in a circular plate shape and a lip portion 22 extending from an entire peripheral edge of the bottom portion 21 to an upper side in a height direction. The expansion member 30 is provided on an inside of the lip portion 22 and configured to outwardly expand the lip portion 22 at a side of an upper portion in the height direction of the lip portion.

2 Claims, 11 Drawing Sheets

(51) Int. Cl.
*F04B 53/14* (2006.01)
*F16J 9/06* (2006.01)
*F16J 15/32* (2006.01)
*F01B 11/00* (2006.01)

(56) References Cited

U.S. PATENT DOCUMENTS

| | | | | |
|---|---|---|---|---|
| 1,831,574 | A | * 11/1931 | Norton | ............ 277/472 |
| 1,945,524 | A | 2/1934 | Foehr | |
| 2,246,685 | A | 6/1941 | Johansen | |
| 3,343,844 | A | 9/1967 | Leschisin | |
| 3,655,208 | A | * 4/1972 | Walker | ............ 277/496 |
| 6,666,656 | B2 | * 12/2003 | Pressel | ............ 417/295 |
| 7,290,481 | B2 | * 11/2007 | Suzuki et al. | ............ 92/240 |
| 2009/0136373 | A1 | * 5/2009 | Adler et al. | ............ 418/63 |
| 2010/0175551 | A1 | * 7/2010 | Stein et al. | ............ 92/172 |

FOREIGN PATENT DOCUMENTS

| | | | | |
|---|---|---|---|---|
| DE | 29717654 U1 | * 11/1998 | | |
| EP | 1508696 A1 | 2/2005 | | |
| GB | 191517222 A | 2/1919 | | |
| GB | 2310464 A | * 8/1997 | ............ | F04B 37/14 |
| JP | U-27-07508 | 9/1952 | | |
| JP | UM-A-S50-77645 | 7/1975 | | |
| JP | UM-A-S56-4687 | 1/1981 | | |
| JP | S58-92544 | 6/1983 | | |
| JP | S-62-97284 | 6/1987 | | |
| JP | 9-68279 | 3/1997 | | |
| JP | 11-325245 | 11/1999 | | |
| JP | 2004316578 A | * 11/2004 | ............ | F04B 39/00 |
| WO | WO2004011804 | * 5/2004 | | |

OTHER PUBLICATIONS

Machine translation of JPH0968279. 2014.*
Machine translation of JPH11-325245A. 2014.*
Machine translation of DE2915848. 2014.*
J P2004316578 machine translation from espacenet. 2015.*
DE29717654 machine translation from OCR text provided by DPMAregister, translation by Google. 2015.*
European Office Action dated Jun. 11, 2015 in European Patent Application No. 14000215.5.

* cited by examiner

ROCKING PISTON TYPE COMPRESSOR

BACKGROUND OF THE INVENTION

1. Field of the Invention

The present invention relates to a rocking piston type compressor in which a piston is rockably and slidably disposed within a cylinder.

2. Related Art

As a piston which is used in a compressor, there is known a rocking piston which is allowed to reciprocate within a cylinder while it is being rocked. In this type of rocking piston, a lip ring is provided on a leading end portion of a piston rod and the lip ring is used to seal up between the cylinder and the piston rod.

The seal performance of the lip ring becomes worse as it is used continuously. Specifically, the lip ring can be deformed due to an influence of a compression heat or a load applied thereto when it is pressed against a wall surface of the cylinder, or can be worn due to a continuous use thereof. Due to this, a seal performance of the lip ring is deteriorated and a compression efficiency is thereby deteriorated.

Even in the case that the seal performance of the lip ring is deteriorated, in a continuously working state of the lip ring, the lip ring is thermally expanded due to the compression heat, whereby the seal performance can be maintained. However, in an initial operation state of the lip ring, or in the case that the lip ring is used in a cold district where the lip ring is also cooled, the seal performance becomes worse until the lip ring is thermally expanded. Also, in the case that a motor of a small output is used, or in the case that the number of rotations of a motor is decreased for a purpose of quietness, a vertical movement of a piston becomes slower, whereby the lip ring is cooled due to an air leaking out from a clearance between the piston and lip ring and thus the seal performance thereof is hard to enhance.

In order to solve the above problems, according to the invention disclosed in Patent Reference 1, there is disclosed a structure in which a lip portion of a piston ring is energized toward a cylinder by an energizing member to thereby seal up between a piston main body and cylinder.

Patent Reference 1: JP-A-09-068279

Here, in the above-mentioned rocking piston, since the piston portion thereof rocks within the cylinder to thereby vary a space between the piston portion and cylinder, in most cases, there is used a flexible lip ring. Thus, in the case that such rocking piston is used in a compressor of a high pressure, the flexible lip ring cannot withstand a load of the high pressure and is thereby deformed, whereby the air leaks from a space between the lip ring and cylinder and thus the compression efficiency is thereby lowered. Therefore, in a conventional compressor, the rocking piston is used in a compressor of a low pressure. In the compressor of the high pressure, the rocking piston is not used.

On the other hand, since the rocking piston is simple in structure, it is hardly out of order and is inexpensive. Therefore, the conventional rocking piston has been required for improvement in order that it can be employed in a compressor of a high pressure. However, in attaining this object, it is necessary to use a lip ring having a large thickness.

However, according to the structure in Patent Reference 1, the piston ring for sealing up between the piston main body and cylinder is a ring having a circular flat plate-like shape in which its lip portion is bent and deformed upwardly in order to press a back-up ring (an energizing member) inwardly. Due to this structure, since the back-up ring (an energizing member) is caused to energize a vicinity of a bent portion of the piston ring. Thus, if that the piston ring is a flexible one, the back-up ring is able to energize the flexible piston ring. However, if the piston ring has a rather large thickness, the back-up ring is incapable of energizing the piston ring.

SUMMARY OF THE INVENTION

One or more embodiments of the invention provide a rocking piston type compressor having a sealing structure which can positively seal between a piston main body and a cylinder and/or can be used in a compressor of a high pressure, even when a lip ring having a seal performance deteriorated due to a deformation or a wear is used in a cold district.

In accordance with one or more embodiments of the invention, a rocking piston type compressor in which a piston rod 11 is rockingly slidable within a cylinder 10 may include a lip ring 20 configured to seal between the cylinder 10 and piston rod 11 and an expansion member 30, 40, 50, 60. The lip ring 20 may be provided on a leading end portion 13 of the piston rod 11 and including a bottom portion 21 in a circular plate shape and a lip portion 22 extending from an entire peripheral edge of the bottom portion 21 to an upper side in a height direction. The expansion member 30, 40, 50, 60 may be provided on an inside of the lip portion 22 and configured to outwardly expand the lip portion 22 at a side of an upper portion in the height direction of the lip portion.

Other aspects and advantages of the invention will be apparent from the following description and the appended claims.

DETAILED DESCRIPTION OF EXEMPLARY EMBODIMENTS

First Exemplary Embodiment

Now, description will be given below of a first exemplary embodiment with reference to FIGS. 1 to 6B.
(Basic Structure of Rocking Pin)

Figure 1:
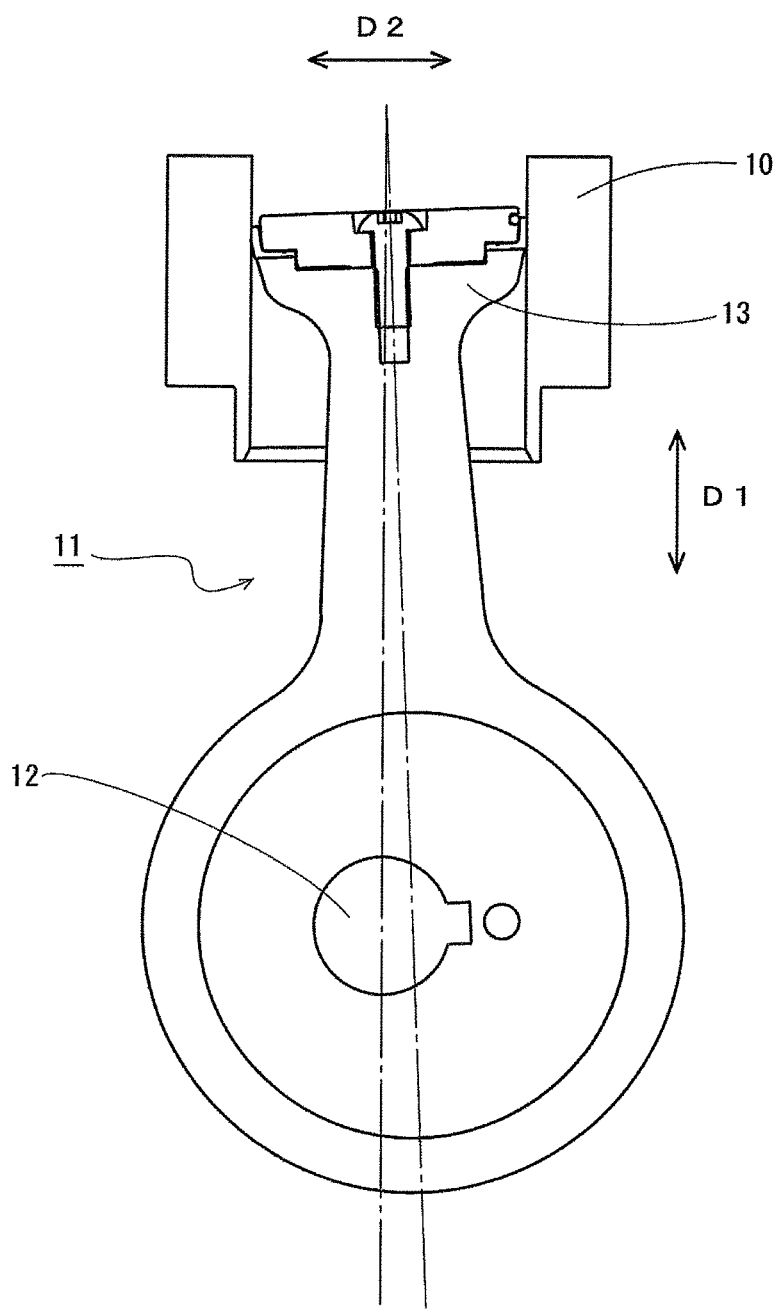
FIG. 1 is a longitudinal section view of a rocking piston according to a first exemplary embodiment.

A rocking piston according to the present exemplary embodiment is disposed within a compressor. As shown in FIG. 1, a piston rod 11 is stored within a cylinder 10.

The piston rod 11 is structured such that it can rockingly slide within the cylinder 10. In the leading end portion 13 of the piston rod 11, there is formed a disc-shaped piston portion. In a bearing hole 12 formed at an eccentric portion of a base portion (large end portion) of the piston rod 11, there is supported a crank shaft (not shown) which is provided on a main body of the compressor, while the crank shaft is operatively connected to a rotation drive apparatus (not shown) provided on the compressor main body.

Owing to this structure, when the rotation drive apparatus is operated, the crank shaft is rotated to thereby rotate the base portion of the piston rod 11 eccentrically, whereby the leading end portion 13 of the piston rod 11 is allowed to reciprocate in a sliding direction (in FIG. 1, in a direction D1). That is, the compressor of the present exemplary embodiment is structured such that, using the rotation of the crank shaft, the piston rod 11 can be reciprocated to compress the air supplied into the cylinder 10 and the compressed air can be sent out to various apparatus or tool which can be operated by the compressed air.

The piston rod 11 of the present exemplary embodiment is structured such that, as shown in FIG. 1, its piston portion is formed integrally therewith. Owing to this, with the reciprocating motion of the piston rod 11, the leading end 13 of the piston rod 11 is caused to rock in a direction (in FIG. 1, in a direction D2) perpendicular to the sliding direction of the piston rod 11.

Figure 2:
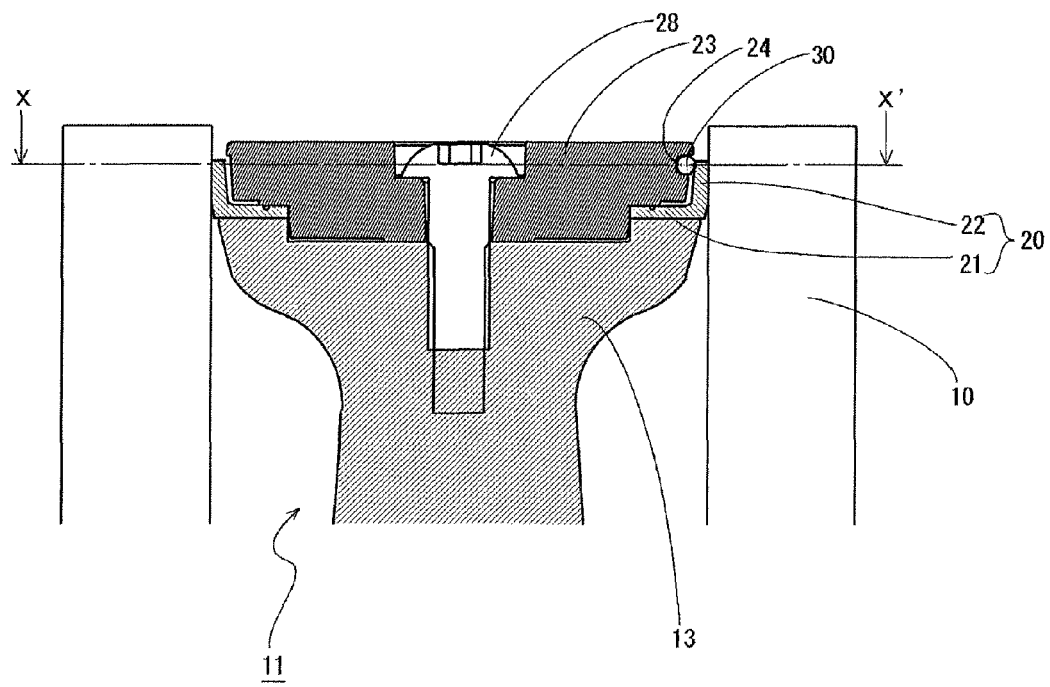
FIG. 2 is a partially enlarged section view of a leading end portion of a piston rod of the first exemplary embodiment.

According to the present exemplary embodiment, as shown in FIG. 2, on an outer periphery of the leading end portion 13 of the piston rod 11, there is mounted a lip ring 20 which is used to seal between the piston rod 11 and cylinder 10. Specifically, a clearance existing between the cylinder 10 and piston rod 11 can be sealed by this lip ring 20. Therefore, even a clearance, which is caused to occur due to a rocking motion of the leading end portion 13 of the piston rod 11, can also be sealed because the lip ring 20 is elastically deformed.

The lip ring 20 is made of a material such as synthetic resin or synthetic rubber which contains therein the following components: poly (tetrafluoroethylene) or modified poly (tetrafluoroethylene), copper or bronze alloy powder, globular carbon or carbon fiber, or molybdenum dioxide. The lip ring 20 is a continuously extending ring-shaped member with no cut portion formed in the entire periphery thereof. Specifically, the lip ring 20 includes a ring-shaped bottom portion 21 and a lip portion 22 which rises from a whole peripheral edge of the ring-shaped bottom portion 21. As shown in FIG. 2, according to the present exemplary embodiment, the lip ring 20 is structured such that it can completely seal up between the cylinder 10 and piston rod 11.

Inside the lip portion 22, as will be described later, an expansion member which is used to expand the lip portion 22 outwardly is disposed on a leading end portion side (in a height direction) of the lip portion 22. By the expansion member, a seal performance of the lip portion 22 can be enhanced.

As shown in FIG. 2, the lip ring 20 is fixed to the upper surface of the piston rod 11 by a ring holder 23. That is, into a recessed portion formed in the upper surface of the piston rod 11, there is fitted the ring holder 23. This ring holder 23 can be fixed to the upper surface of the piston rod 11 by a fixing bolt 28 which is inserted into the piston rod 11 from above. The lip ring 20 is fixed in such a manner that it is held by the ring holder 23 and piston rod 11.

Between the entire periphery of the peripheral edge portion of the lower portion of the ring holder 23 and lip ring 20, as shown in FIG. 2, there is formed a clearance. Due to this, when the lip ring 20 is expanded by an expansion member, it can be deformed in such a manner that it is expanded outwardly from the rising base portion of the lip portion 22, thereby being able to positively seal between the piston rod 11 and cylinder 10.

Thus, according to the present exemplary embodiment, since there is employed the lip ring 20 the lip portion 22 of which rises from the entire peripheral edge of the ring-plate-shaped bottom portion 21, the lip portion 22 is allowed to have a proper thickness. Also, since, on the height direction upper portion side of the lip portion 22 of the lip ring 20, there is provided the expansion member which is used to expand the lip portion 22 outwardly on the height direction upper portion side of the lip portion 22, even in the case that the lip portion 22 has a properly large thickness, the lip portion 22 can be expanded on the height direction leading end portion side thereof, that is, in the vicinity of the free end thereof, which makes it possible to positively seal between the piston rod 11 and cylinder 10. Due to this, even in the case of a compressor of a high pressure, there can be employed a rocking piston which is inexpensive and can be hardly out of order; and, even when the lip ring 20 the seal performance of which has been deteriorated due to the deformation or wear thereof is used in a cold district or the like, it is possible to positively seal between the piston rod 11 and cylinder 10.
(Details of Seal Structure)

Next, description will be given below of the details of the seal structure according to the present exemplary embodiment.

As shown in FIG. 2, in the seal structure according to the present exemplary embodiment, as an expansion member, there is provided a ring spring 30 for expanding the lip portion 22 outwardly on the height direction upper portion side of the lip portion 22.

Figures 3A, 3B:
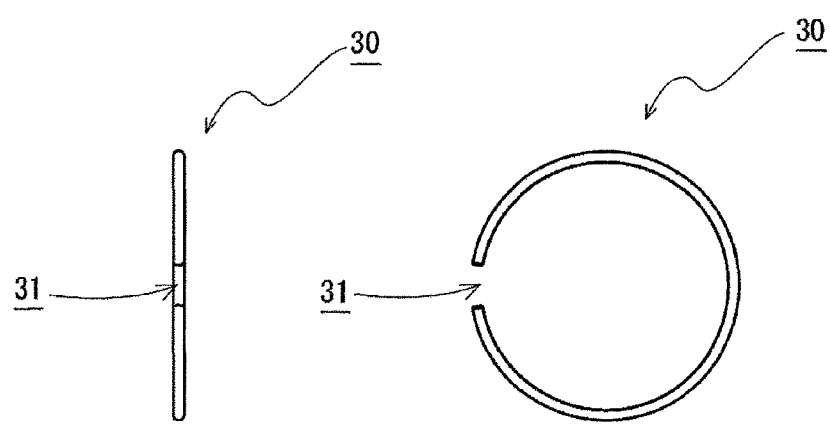
FIG. 3A is a side view of a ring spring of the first exemplary embodiment.
FIG. 3B is a plan view of the ring spring of FIG. 3A.
Figure 4:
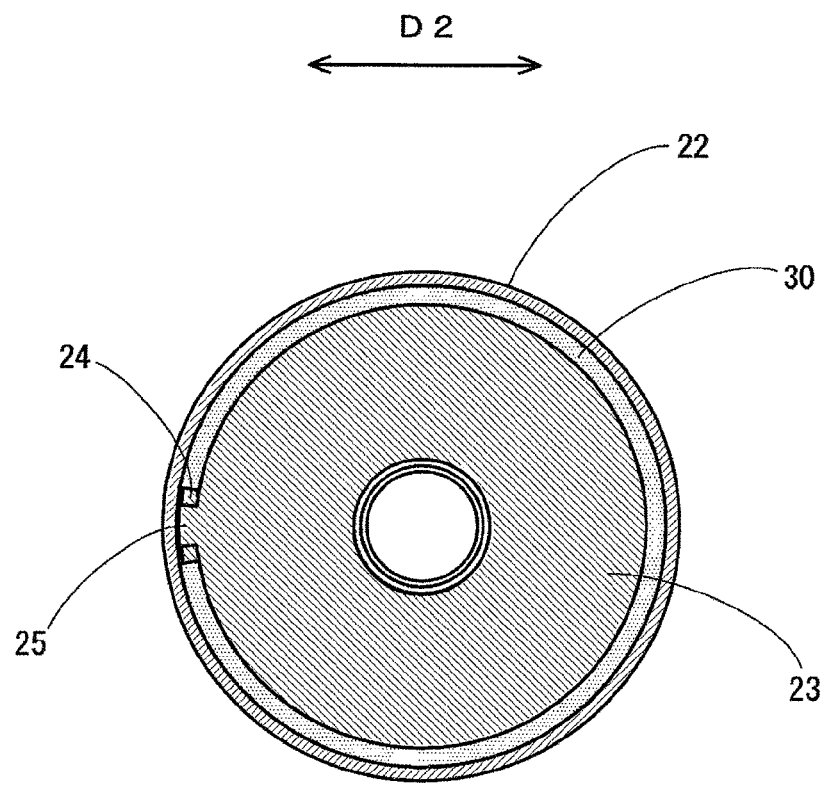
FIG. 4 is a transverse section view (a section view taken along the X-X' line shown in FIG. 2) of the leading end portion of the piston rod of the first exemplary embodiment.

The ring spring 30 is structured such that, as shown in FIG. 3B, a portion of its periphery is cut out; and thus it has a C-like shape including a cut-out portion 31. When the ring spring 30 is used, as shown in FIGS. 2 and 4, it is fitted into a peripheral groove 24 which is formed in the outer peripheral surface of the ring holder 23. In this case, a portion of the peripheral groove 24 of the ring holder 23 in the peripheral direction thereof does not constitute the groove but constitutes a non-groove portion 25. Due to this, the ring spring 30 can be fitted in such a manner that the cut-out portion 31 of the ring spring 30 is disposed at the position of the non-groove portion 25, which makes it possible to determine a direction where the ring spring 30 is disposed. Here, the non-groove portion 25, as shown in FIG. 4, is formed in one side peripheral edge of the ring holder 23 in the rocking direction D2 of the piston rod 11. That is, the ring spring 30 is disposed such that the cut-out portion 31 extends in the rocking direction D2 of the piston rod 11.

The outer peripheral diameter of the ring spring 30 is formed slightly larger than the inner peripheral diameter of the lip portion 22 with which the ring spring 30 can be contacted, whereby, when the ring spring 30 is fitted into the peripheral groove 24, it can expand the lip portion 22 outwardly.

Here, since the ring spring 30 provided inside the lip portion 22 is pressed inwardly by the lip portion 22, the diameter of the ring spring 30 is reduced in such a manner that the cut-out portion 31 is closed. The ring spring 30, normally, has a substantially complete round shape but, when the ring spring 30 is reduced in diameter such that the cut-out portion 31 is closed, it is deformed into a substantially elliptic shape the major axis of which passes on the cut-out portion 31. As described above, since the ring spring 30 is disposed inside the lip portion 22 in such a manner that the non-groove portion 25 extends in the rocking direction D2 of the piston rod 11, the ring spring 30 is deformed in such a manner that the major axis direction of the substantially elliptic shape thereof provides the rocking direction D2 of the piston rod 11.

Here, since a space between the piston rod 11 and cylinder 10 varies in the rocking direction D2 of the piston rod 11, the space between the piston rod 11 and cylinder 10 in the rocking direction D2 is the space that requires the highest seal performance. According to the present exemplary embodiment, since the major axis of the substantially elliptic shape of the ring spring 30 provides the rocking direction D2 requiring the highest seal performance, the lip portion 22 is outwardly expanded most intensely in the rocking direction D2, thereby being able to positively seal between the piston rod 11 and cylinder 10.

Figure 5A:
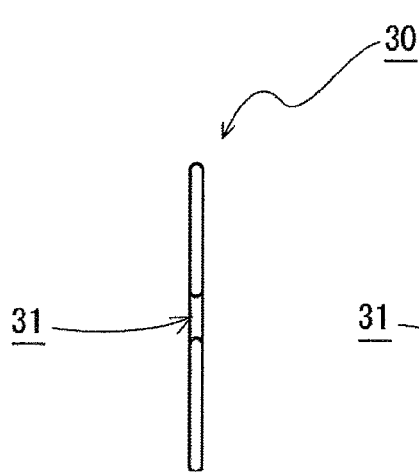
FIG. 5A is a side view of a ring spring according to a modification of the first exemplary embodiment.
Figure 5B:
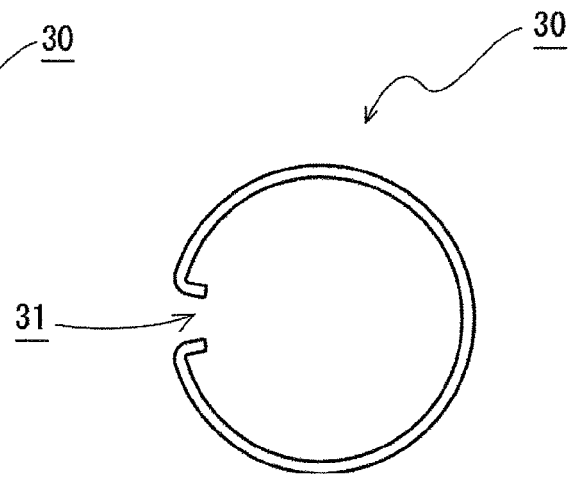
FIG. 5B is a plan view of the ring spring of FIG. 5A.
Figures 6A, 6B:
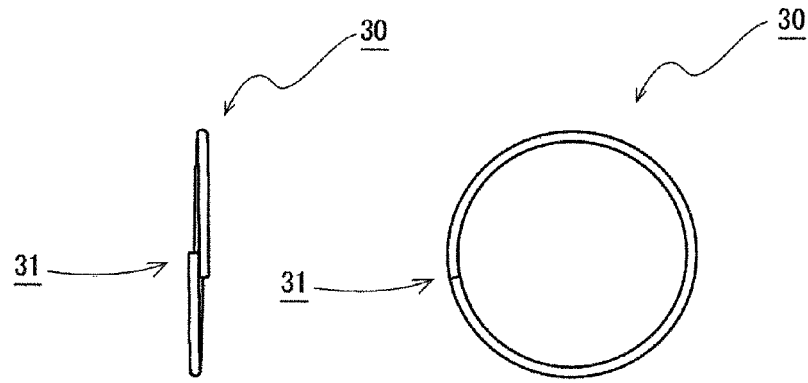
FIG. 6A is a side view of a ring spring according to another modification of the first exemplary embodiment.
FIG. 6B is a plan view of the ring spring of FIG. 6A.

Here, as the ring spring 30 according to the present exemplary embodiment, the ring spring 30 having the above shape is not limitative. For example, as shown in FIG. 5B, there may also be used a ring spring 30 having a shape in which the two ends of the cut-out portion 31 are bent inwardly, or, as shown in FIG. 6A, there may also be used a ring spring 30 having a shape in which the two ends of the cut-out portion 31 are superimposed on top of each other.

Second Exemplary Embodiment

Now, description will be given below of a second exemplary embodiment according to the invention with reference to FIGS. 7 to 9. In the second exemplary embodiment, instead of the ring spring 30 according to the first exemplary embodiment, a crown-shaped member 40 is used as an expansion member.

Here, since the basic structure of a rocking piston according to the second exemplary embodiment is similar to the above-mentioned basic structure according to the first exemplary embodiment, the duplicate description is omitted here and description will be given below only of specific points of the present exemplary embodiment. That is, since the present exemplary embodiment has a rocking piston seal structure which is different from the first exemplary embodiment, description will be given here only of this structure.

Figure 7:
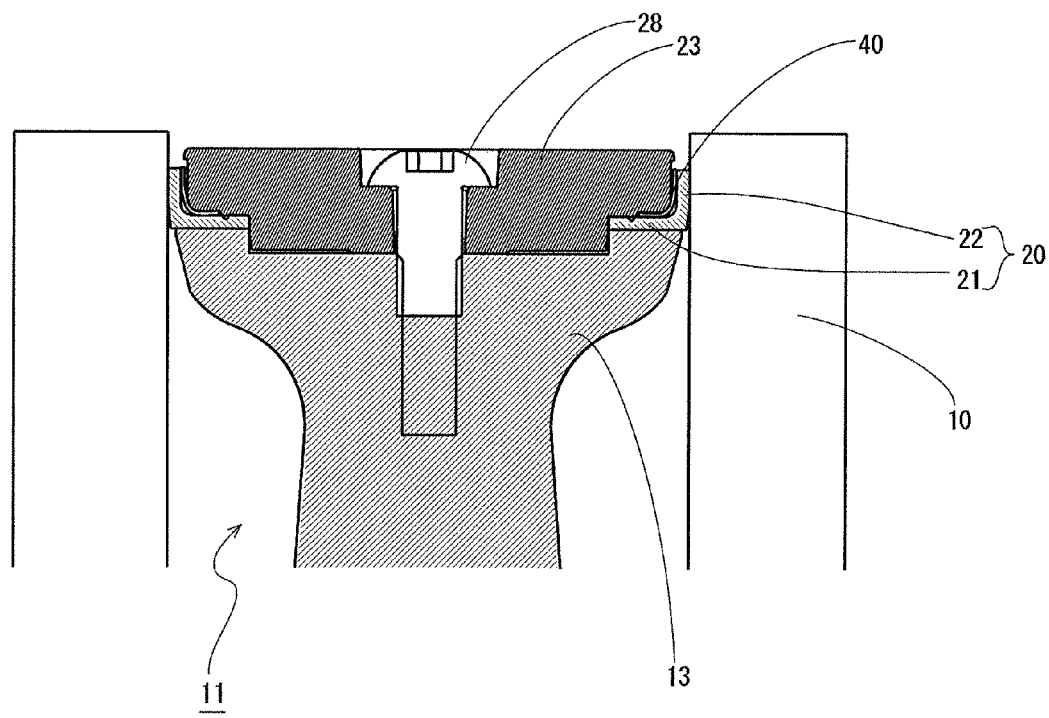
FIG. 7 is a partially enlarged section view of a leading end portion of a piston rod according to a second exemplary embodiment.
Figure 8A:
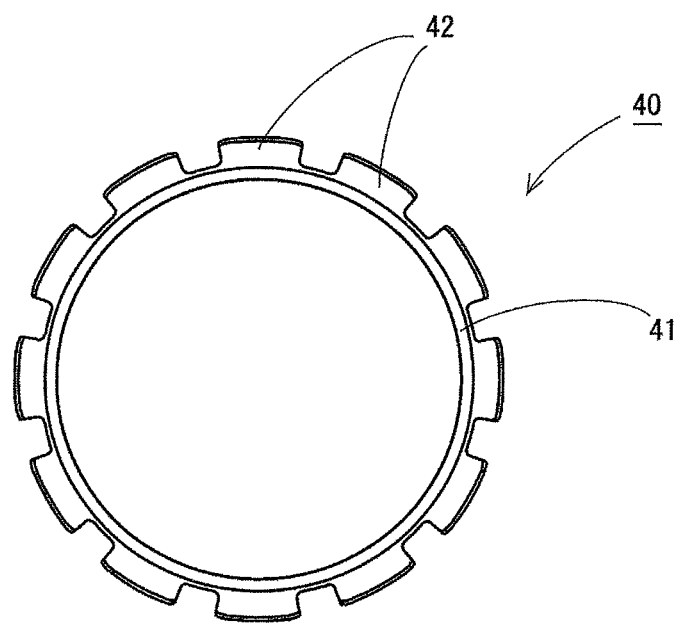
FIG. 8A is a plan view of a crown-shaped member according to the second exemplary embodiment.

As shown in FIG. 7, in the seal structure according to the present exemplary embodiment, a crown-shaped member 40 is used to expand the lip portion 22 outwardly on the height direction upper portion side of the lip portion 22.

Figure 8B:
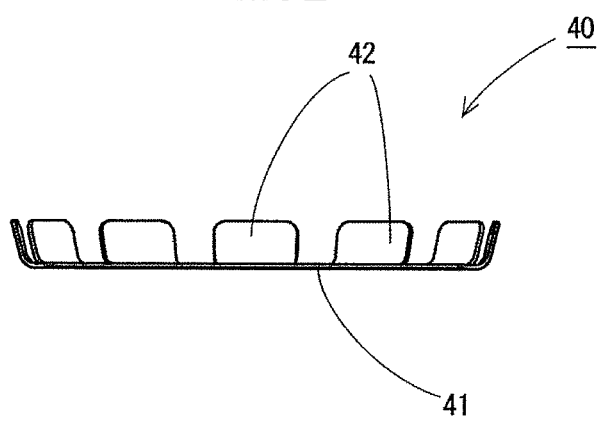
FIG. 8B is a side view of the crown-shaped member of FIG. 8A.

The crown-shaped member 40 is structured such that, as shown in FIG. 8B, it includes a base portion 41 formed in a ring shape and multiple rising pieces 42 which respectively rise from the peripheral edge of the base portion 41. The multiple rising pieces 42 are respectively formed to spread gradually outwardly toward the open end 43 side of the member 40 to thereby constitute plate springs respectively. The base portion 41 of the crown-shaped member 40, as shown in FIG. 9, is held by and between the lower surface of the ring holder 23 and the bottom portion 21 of the lip ring 20, whereby the crown-shaped member 40 is fixed in such a manner that it extends along the inner periphery of the lip ring 20.

Figure 9:
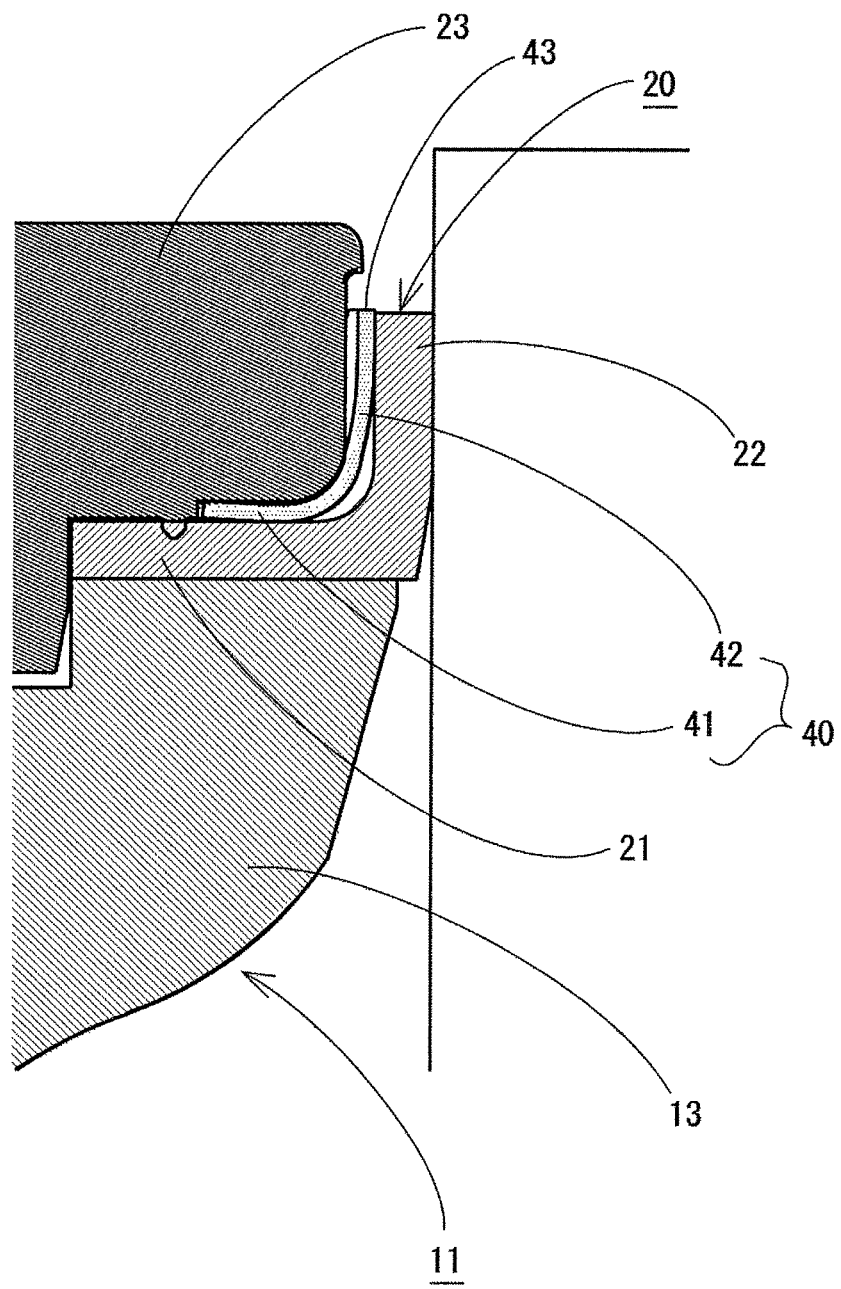
FIG. 9 is a partially enlarged longitudinal section view of a seal structure portion according to the second exemplary embodiment.

The open ends 43 of the multiple rising pieces 42 of the crown-shaped member 40, as shown in FIG. 9, are respectively formed to project upwardly of the end edge of the lip portion 22. Also, the outer peripheral diameters of the open ends 43 of the rising pieces 42 are formed slightly larger than the inner peripheral diameter of the end edge of the lip portion 22, whereby the rising pieces 42 of the crown-shaped member 40 are allowed to expand the end edge of the lip portion 22 outwardly.

As described above, according to the present exemplary embodiment, the multiple rising pieces 42 are capable of applying loads to the lip portion 22 individually and also they can apply the loads to the lip portion according to the shape of the lip portion 22 that can be deformed due to the rocking motion of the piston rod 11. This makes it possible to positively seal up between the piston rod 11 and cylinder 10.

Here, in the above exemplary embodiment, the open ends 43 of the rising pieces 42 of the crown-shaped member 40 are respectively formed to project upwardly of the end edge of the lip portion 22. However, this is not limitative. That is, the rising pieces 42 of the crown-shaped member 40 may only be capable of expanding the lip portion 22 outwardly on the height direction upper portion side of the lip portion 22, or may also be capable of expanding such portion of the lip portion 22 outwardly as exists downwardly of the end edge of the lip portion 22.

Third Exemplary Embodiment

Figure 11A:
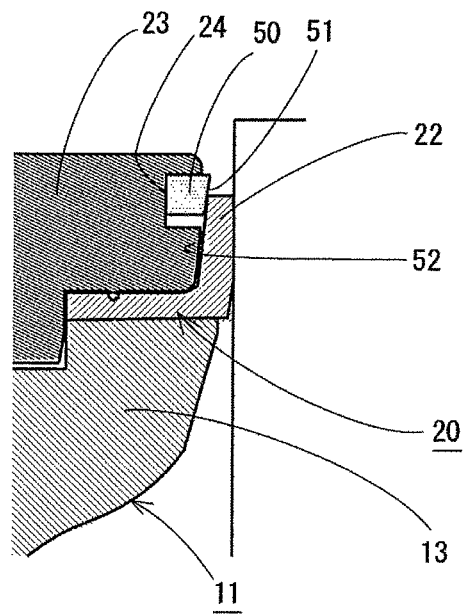
FIG. 11A is a partially enlarged longitudinal section view of a seal structure portion of the third exemplary embodiment in its normal state.
Figure 11B:
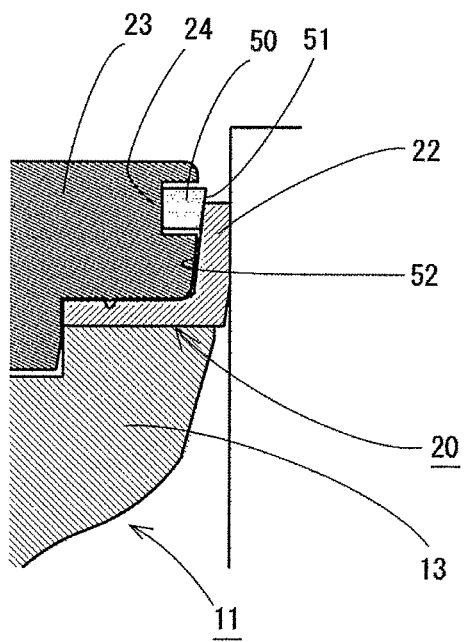
FIG. 11B is a partially enlarged longitudinal section view of the seal structure portion of the third exemplary embodiment in its compressed state.
Figure 12:
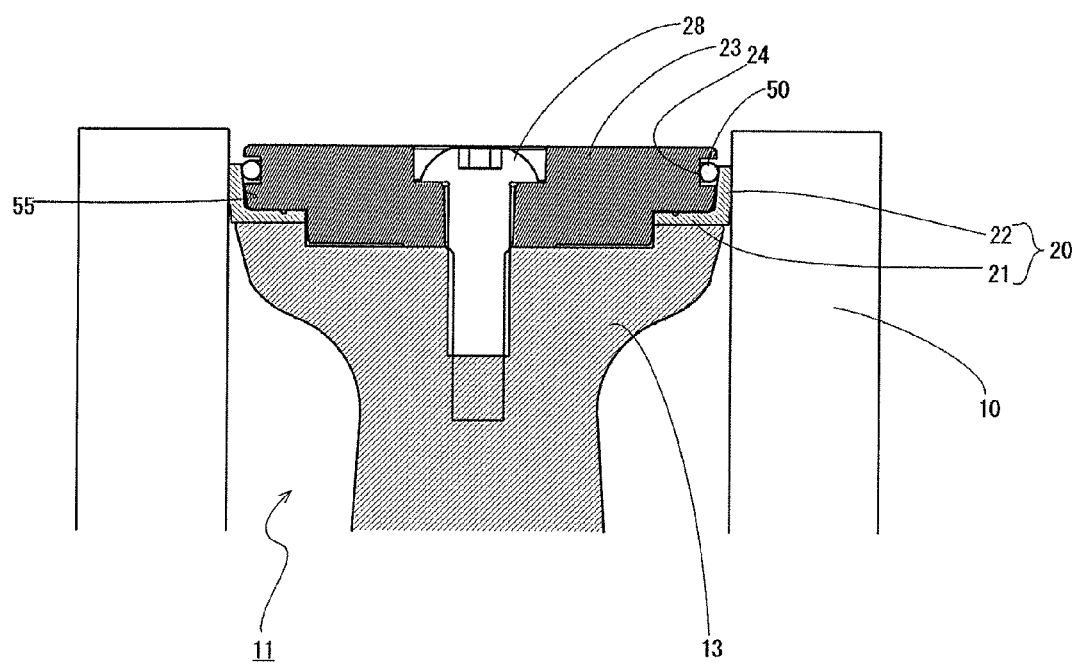
FIG. 12 is a partially enlarged section view of a leading end portion of a piston rod according to a modification of the second exemplary embodiment.

Now, description will be given below of a third exemplary embodiment with reference to FIGS. 10 to 12. In the third exemplary embodiment, instead of the ring spring 30 according to the first exemplary embodiment, a ring-shaped metal member 50 is used as an expansion member.

Here, since the basic structure of a rocking piston according to the third exemplary embodiment is similar to the above-mentioned basic structure according to the first exemplary embodiment, the duplicate description is omitted here and description will be given below only of specific points of the present exemplary embodiment. That is, since the present exemplary embodiment has a rocking piston seal structure which is different from the first exemplary embodiment, description will be given here only of this structure.

Figure 10:
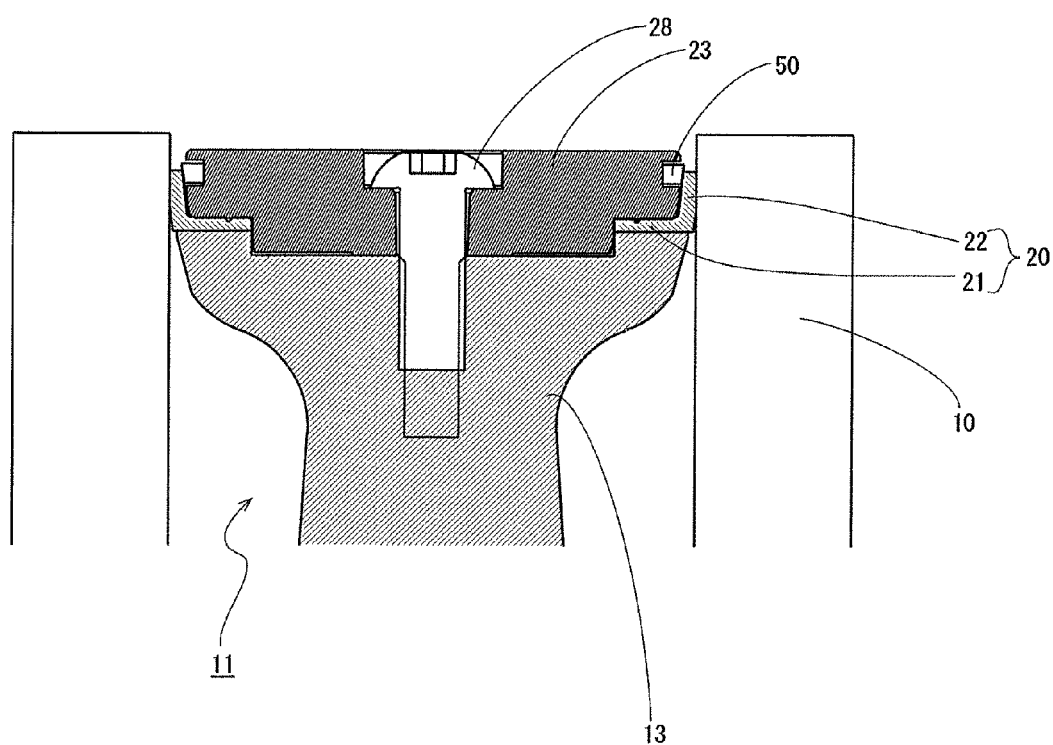
FIG. 10 is a partially enlarged section view of a leading end portion of a piston rod according to a third exemplary embodiment.

As shown in FIG. 10, in the seal structure according to the present exemplary embodiment, a ring-shaped metal member 50 is used to expand the lip portion 22 outwardly on the height direction upper portion side of the lip portion 22.

The ring-shaped metal member 50, as shown in FIG. 10, is a ring-shaped member the section of which has a trapezoid shape and also which has no cut-out portion. The ring-shaped metal member 50 is formed to have a tapered shape in which the diameter of the outer peripheral surface thereof increases gradually toward the leading end side thereof. When the ring-shaped metal member 50 is used, as shown in FIG. 11A, it is fitted into a peripheral groove 24 which is formed in the outer peripheral surface of the ring holder 23. Here, the peripheral groove 24 of the ring holder 23, differently from the first exemplary embodiment, is formed to extend over the entire periphery of the ring holder 23.

Here, the peripheral groove 24 of the ring holder 23 is formed such that, as shown in FIG. 11A, the width thereof is larger than the height of the ring-shaped metal member 50 (the width thereof in the sliding direction D1 of the piston rod). Owing to this, the ring-shaped metal member 50 is allowed to slide within the peripheral groove 24 along the inner peripheral surface 52 of the lip portion 22.

Here, the inner peripheral surface of the lip portion 22 is also formed to have a tapered shape which, as shown in FIG. 11A, increases in diameter gradually toward the leading end side thereof. And, the minimum outside diameter of the tapered surface of the ring-shaped metal member 50 (the outside diameter of the counter-leading end side thereof) is formed larger than the maximum inside diameter of the tapered surface of the lip portion 22 (the inside diameter of the leading end side thereof). Therefore, normally, as shown in FIG. 11A, the ring-shaped metal member 50 is situated in the upper portion of the peripheral groove 24.

And, when the piston rod 11 starts its reciprocating motion and slides in the compression direction (in FIG. 11A, in the upward direction), the ring-shaped metal member 50, due to the inertia that is generated when it moves from its suction step to its compression step, is allowed to slide in the counter-leading-end direction to thereby expand the lip portion 22 outwardly. And, the ring-shaped metal member 50, which has slid in the counter-leading-end direction, while it is operating in the compression step, maintains the seal position due to the air pressure and then returns to the position shown in FIG. 11A due to the inertia that is generated when the ring-shaped metal member 50 enters the suction step.

As described above, according to the present exemplary embodiment, in the compression operation time that requires the seal performance, the present seal structure is positively able to seal between the piston rod 11 and cylinder 10.

Here, in the above exemplary embodiment, the outer peripheral surface 51 of the ring-shaped metal member 50 and the inner peripheral surface of the lip portion 22 are both formed to have a tapered shape the diameter of which increases gradually toward the leading end side thereof. However, this is not limitative. That is, as shown in FIG. 12, only the upper portion of the inner peripheral surface of the lip portion 22 may be formed to have a tapered shape the diameter of which increases gradually toward the leading end side thereof. For example, in FIG. 11A, the inner peripheral surface of the lip portion 22 may be formed as a straight surface; and, the upper portion of the inner peripheral surface of the lip portion 22 and the outer peripheral surface 51 of the ring-shaped metal member 50 may be contacted with each other.

Fourth Exemplary Embodiment

Now, description will be given below of a fourth exemplary embodiment according to the invention with reference to FIGS. 13 to 14B. In the fourth exemplary embodiment, instead of the ring spring 30 according to the first exemplary embodiment, a non-metal member 60 is used as an expansion member.

Here, since the basic structure of a rocking piston according to the fourth exemplary embodiment is similar to the above-mentioned basic structure according to the first exemplary embodiment, the duplicate description is omitted here and description will be given below only of the specific points of the present exemplary embodiment. That is, since the present exemplary embodiment has a rocking piston seal structure which is different from the first exemplary embodiment, description will be given here only of this structure.

Figure 13:
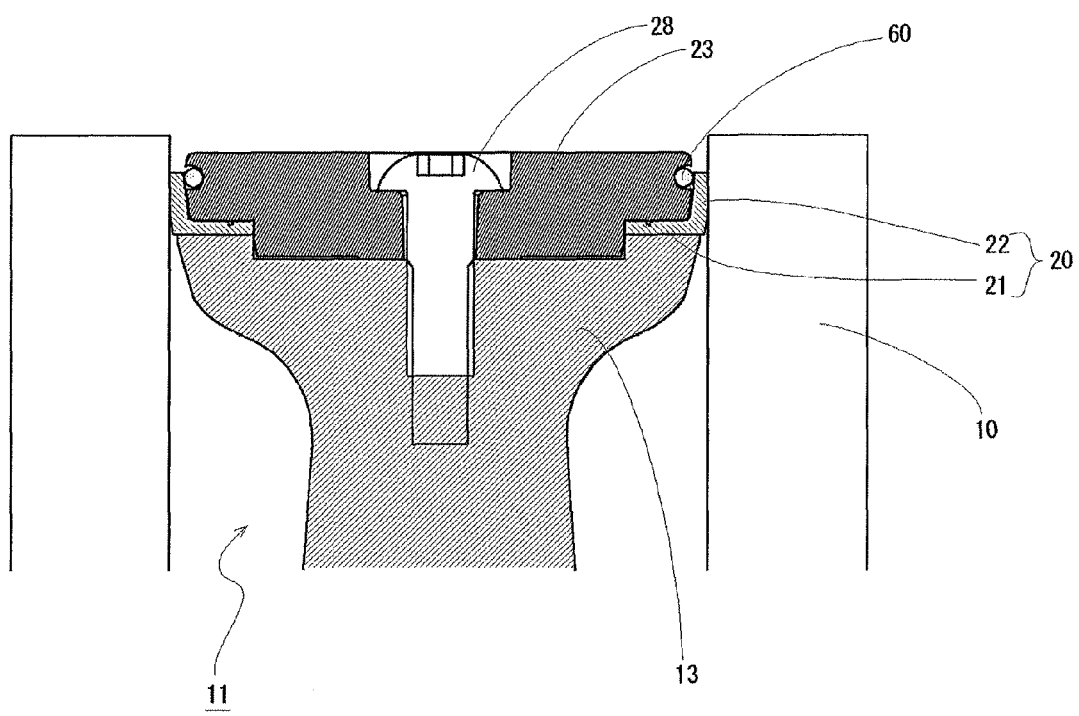
FIG. 13 is a partially enlarged section view of a leading end portion of a piston rod according to a fourth exemplary embodiment.

As shown in FIG. 13, in a seal structure according to the present exemplary embodiment, a non-metal member 60 is used to expand the lip portion outwardly on the height direction upper portion side of the lip portion 22.

The non-metal member 60, as shown in FIG. 13, is a ring member which has no cut portion therein and is used to expand the lip portion 22 outwardly due to the thermal expansion thereof.

When the non-metal member 60 is used, it is fitted into a peripheral groove 24 formed in the outer peripheral surface of the ring holder 23. Here, the peripheral groove 24 of the ring holder 23 is formed such that, differently from the first exemplary embodiment, it extends over the entire periphery of the ring holder 23.

The outer peripheral diameter of the non-metal member 60 is formed slightly larger than or substantially equal to the inner peripheral diameter of the lip portion 22 with which the non-metal member 60 can be contacted. Owing to this, when the non-metal member 60 fitted into the peripheral groove 24 is thermally expanded due to the compression heat, it can expand the lip portion 22 outwardly.

Also, since the non-metal member 60 is made of a material having a larger coefficient of linear expansion than the ring holder 23, the linear expansion thereof can be facilitated, thereby being able to realize the enhanced seal performance earlier than the prior art technology.

Figure 14A:
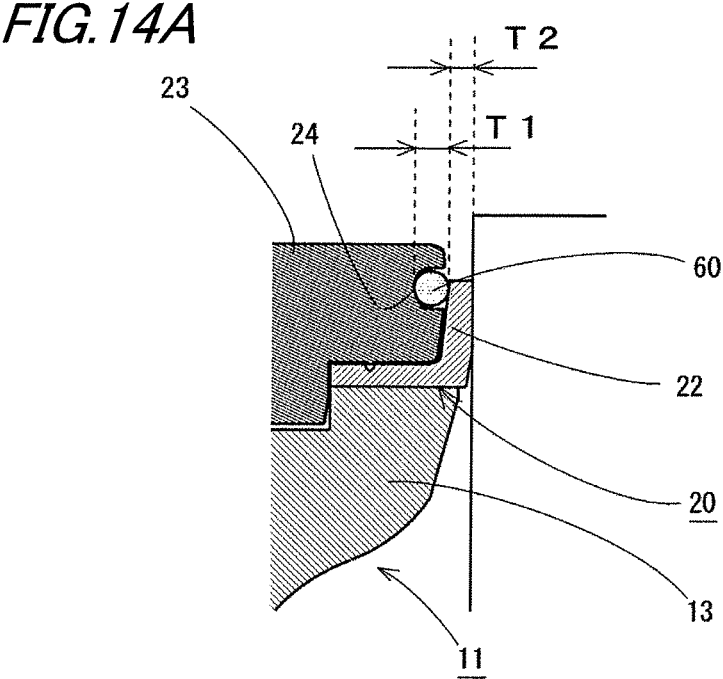
FIG. 14A is a partially enlarged longitudinal section view of a seal structure portion of the fourth exemplary embodiment in its normal state.

Also, as shown in FIG. 14A, the thickness T1 of the non-metal member 60 is set larger than the thickness T2 of the lip portion 22. Due to this, the thermal expansion of the non-metal member 60 can be facilitated further and thus the enhanced seal performance can be realized earlier than the prior art technology.

Figure 14B:
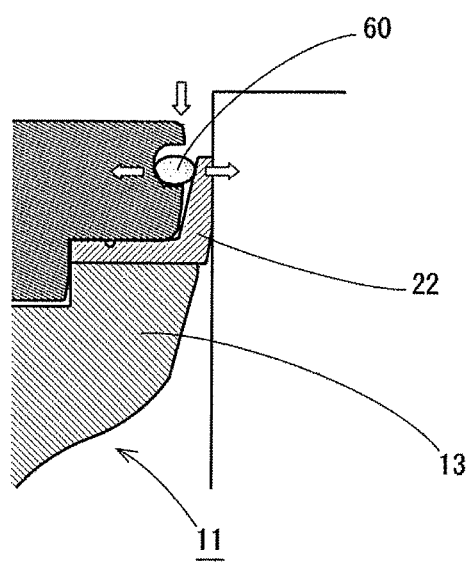
FIG. 14B is a partially enlarged longitudinal section view of the seal structure portion of the fourth exemplary embodiment in its compressed state.

Further, as shown in FIG. 14B, the non-metal member 60 is structured such that it can be elastically deformed due to the air pressure provided when the piston rod 11 sucks the air to thereby expand the lip portion 22 outwardly. Therefore, the seal performance can be enhanced due to the elastic deformation thereof in addition to the thermal expansion thereof.

As described above, according to the present exemplary embodiment, there are provided various devices which are useful in sealing between the piston rod 11 and cylinder 10 due to the thermal expansion of the non-metal member 60 and in enhancing the seal performance thereof. This makes it possible to positively seal between the piston rod 11 and cylinder 10.

In accordance with the above exemplary embodiments, a rocking piston type compressor in which a piston rod 11 is rockingly slidable within a cylinder 10 may be provided with a lip ring 20 and an expansion member 30, 40, 50, 60. The lip ring 20 is configured to seal between the cylinder 10 and piston rod 11. The lip ring 20 may be provided on a leading end portion 13 of the piston rod 11 and may include a bottom portion 21 in a circular plate shape and a lip portion 22 extending from an entire peripheral edge of the bottom portion 21 to an upper side in a height direction. The expansion member 30, 40, 50, 60 may be provided on an inside of the lip portion 22 and configured to outwardly expand the lip portion 22 at a side of an upper portion in the height direction of the lip portion.

According to this structure, since the lip ring includes the lip portion that is raised from the entire peripheral edge of the circular-plate-shaped bottom portion of the lip ring, the lip portion can be formed to have a rather large thickness. Also, since there is provided the expansion member that can expand the lip portion outwardly on the height direction upper portion side of the lip ring, even in the case that the lip portion has a rather large thickness, it is possible to expand the lip portion in the vicinity of the free end thereof, thereby being able to positively seal between the piston main body and cylinder. Therefore, even in the case of a compressor of a high pressure, there can be employed a rocking piston which is inexpensive and can hardly break down; and also, even in the case that a lip ring the seal performance of which has been deteriorated due to the deformation or wear thereof is used in a cold district or the like, it is possible to positively seal the piston main body and cylinder.

The expansion member may comprise a ring spring 30 a portion of the periphery of which is cut out. The ring spring 30 may be formed to have a substantially elliptic shape when the ring spring 30 is disposed inside the lip portion 20 and is thereby reduced in diameter.

According to this structure, the lip portion is expanded outwardly most intensely in the major axis direction of such substantially elliptic shape, which makes it possible to positively seal between the piston main body and cylinder.

The ring spring 30 may be formed such that a major axis direction of the substantially elliptic shape of the ring spring 30 corresponds to a rocking direction of the piston rod 11.

A direction where a space between the piston rod and cylinder varies greatly is the rocking direction of the piston rod. Thus, the space between the piston rod and cylinder in such rocking direction requires the highest seal performance. According to this structure, since the major axis of the substantially elliptic shape is disposed in the direction that requires such highest seal performance, in this direction, the lip portion is outwardly expanded most intensely, thereby being able to positively seal between the piston main body and cylinder.

The expansion member may comprise a crown-shaped member 40 including a circular-shaped base portion 41 and a plurality of rising pieces 42 respectively rising from a peripheral edge of the base portion 41. The rising pieces 42 may respectively comprise plate springs outwardly expanding gradually toward open end portions 43 of the rising pieces 42.

According to this structure, the rising pieces are allowed to apply loads to the lip portion individually and thus they are able to apply proper loads to the lip portion according to the varying shapes of the lip portion caused by the rocking motion of the piston rod. This makes it possible to positively seal between the piston main body and cylinder.

The open end portions 43 of the rising pieces 42 may respectively project beyond an end edge of the lip portion 22 in the height direction.

According to this structure, the rising pieces 42 can expand the peripheral edge of the lip portion outwardly, thereby being able to positively seal between the piston main body and cylinder.

A ring holder 23 may be provided on the leading end portion 13 of the piston rod 11 and configured to fix the lip ring 20. A peripheral groove 24 into which the crown-shaped member 40 fits may be formed on an outer peripheral surface of the ring holder 23.

According to this structure, the crown-shaped member can be fixed firmly.

The expansion member may comprise a ring-shaped metal member 50 which is slidable along an inner peripheral surface 52 of the lip portion 22. At least one of the inner peripheral surface 52 of the lip portion 22 and an outer peripheral surface 51 of the ring-shaped metal member 50 may be formed to have a tapered shape gradually increasing in diameter toward a leading end thereof. When piston rod 11 slides in a compression direction, the ring-shaped metal member 50 may slide along the inner peripheral surface 52 of the lip portion 22 and the ring-shaped metal member 50 may relatively move to a lower side in the height direction with respect to the lip portion 22 to thereby expand the lip portion 22 outwardly.

According to this structure, in the compression operation that requires the seal performance, it is possible to positively seal between the piston main body and cylinder.

A ring holder 23 may be provided on the leading end portion 13 of the piston rod 11 and configured to fix the lip ring 20. A peripheral groove 24 into which the expansion member 30, 50, 60 fits may be formed on an outer peripheral surface of the ring holder 23.

According to this structure, without producing a dead space in the side surface of the ring holder, the ring-shaped expansion member can be fixed firmly.

A clearance may be formed between an entire periphery of a peripheral edge portion of a lower portion of the ring holder 23 and the lip ring 22.

According to this structure, when the lip ring is expanded by the expansion member, it can be deformed in such a manner that it is expanded outwardly from the rising portion of the lip portion, thereby being able to positively seal between the piston main body and cylinder.

The expansion member may comprise a ring-shaped non-metal member 60 configured to outwardly expand the lip portion 22 due to a thermal expansion of the non-metal member 60. The non-metal member 60 may be disposed on an outer periphery of a ring holder 23 provided on the leading end portion 13 of the piston rod 11. The non-metal member 60 may be made of a material having a coefficient of linear expansion which is lager than a coefficient of linear expansion of the ring holder 23.

According to this structure, the thermal expansion can be accelerated, whereby the enhanced seal performance can be realized earlier than the prior art.

The non-metal member 60 may be formed to have a larger thickness than a thickness of the lip portion 22.

According to this structure, the thermal expansion can be accelerated, whereby the enhanced seal performance can be realized earlier than the prior art.

The non-metal member 60 may be configured to be elastically deformed due to an air pressure generated when the piston rod 11 compresses an air to thereby outwardly expand the lip portion 22.

According to this structure, the seal performance can be enhanced due to the pressure of the elastic deformation of the non-metal member in addition to the thermal expansion thereof.

DESCRIPTION OF REFERENCE NUMERALS AND SIGNS

10: Cylinder
11: Piston rod
12: Bearing hole
13: Leading end portion
20: Lip ring
21: Bottom portion
22: Lip portion
23: Ring holder
24: Peripheral groove
25: Non-groove portion
28: Fixing bolt 30: Ring spring (expansion member)
31: Cut-out portion
40: Crown-shaped member (expansion member)
41: Base portion
42: Rising piece
43: Open end
50: Ring-shaped metal member (expansion member)
51: Outer peripheral surface of ring-shaped metal member
52: Inner peripheral surface of lip portion
60: Non-metal member (expansion member)
D1: Sliding direction of piston rod
D2: Rocking direction of piston rod
T1: Thickness of non-metal member
T2: Thickness of Lip ring

What is claimed is:

1. A rocking piston type compressor in which a piston rod is rockingly slidable within a cylinder, the compressor comprising:
   a lip ring configured to seal between the cylinder and piston rod, the lip ring being provided on a leading end portion of the piston rod and including a bottom portion in a circular plate shape and a lip portion rising from an entire peripheral edge of the bottom portion along the cylinder; and
   an expansion member provided on an inside of the lip portion and configured to outwardly expand the lip portion at a distal-most end of the lip portion,
   wherein the expansion member comprises a circular ring spring a portion of the periphery of which is cut out,
   wherein the circular ring spring is deformed to have an elliptic shape when the ring spring is disposed inside the lip portion,
   wherein the ring spring is formed such that a major axis direction of the elliptic shape of the ring spring corresponds to a rocking direction of the piston rod, and
   wherein the rocking piston type compressor further comprises:
   a ring holder provided on the leading end portion of the piston rod and configured to fix the lip ring,
   wherein a peripheral groove into which the ring spring fits is formed on an outer peripheral surface of the ring holder adjacent the distal-most end of the lip portion such that the ring spring contacts the distal-most end of the lip portion,
   wherein the peripheral groove comprises a non-groove portion in a peripheral direction, and
   wherein the non-groove portion is formed in one side peripheral edge of the ring holder in a rocking direction of the piston rod.

2. The rocking piston type compressor according to claim 1, wherein a clearance is defined between an entire periphery of a peripheral edge portion of a lower portion of the ring holder and the lip ring.

* * * * *